United States Patent [19]

Smith et al.

[11] Patent Number: 4,995,231
[45] Date of Patent: Feb. 26, 1991

[54] PERFORMANCE ARCJET THRUSTER

[75] Inventors: Richard D. Smith, Kirkland; Steve Knowles, Seattle; R. J. Cassady, Bellevue; William Smith, Seattle; Mark A. Simon, Redmond, all of Wash.

[73] Assignee: Olin Corporation, Stamford, Conn.

[21] Appl. No.: 411,798

[22] Filed: Sep. 25, 1989

Related U.S. Application Data

[62] Division of Ser. No. 150,591, Feb. 1, 1988, Pat. No. 4,926,637.

[51] Int. Cl.$^5$ ............................................. F02K 11/00
[52] U.S. Cl. ................................. 60/203.1; 219/121.51; 313/231.41
[58] Field of Search .................. 60/203.1, 202, 200.1, 60/39.462, 39.461; 219/121.48, 121.49, 121.51, 121.55; 313/231.51, 231.41, 231.31, 362.1

[56] References Cited

U.S. PATENT DOCUMENTS

| | | | |
|---|---|---|---|
| 2,862,099 | 11/1958 | Gage | 60/203.1 |
| 2,906,858 | 9/1959 | Morton, Jr. | 60/203.1 |
| 3,225,245 | 12/1965 | Takei et al. | 219/121.48 |
| 3,242,308 | 3/1966 | Yamamoto | 313/231.41 |
| 3,309,873 | 3/1967 | Cann | 60/203.1 |
| 3,359,734 | 12/1967 | Ferrie et al. | 60/203.1 |
| 3,425,223 | 2/1969 | Browning | 60/203.1 |
| 3,603,089 | 9/1971 | Esker et al. | 60/203.1 |
| 4,035,684 | 7/1977 | Svoboda et al. | 313/231.41 |
| 4,548,033 | 10/1985 | Cann | 60/203.1 |
| 4,596,918 | 6/1986 | Ponghis | 219/121.48 |
| 4,764,656 | 8/1988 | Browning | 219/121.51 |

FOREIGN PATENT DOCUMENTS

| | | | |
|---|---|---|---|
| 736055 | 6/1966 | Canada | 313/231.41 |
| 67789 | 4/1985 | Japan | 60/203.1 |
| 145468 | 7/1985 | Japan | 60/203.1 |
| 920079 | 3/1963 | United Kingdom | 60/203.1 |

Primary Examiner—Louis J. Casaregola
Assistant Examiner—Timothy S. Thorpe
Attorney, Agent, or Firm—John R. Wahl

[57] ABSTRACT

An arcjet thruster has a body defining a constrictor and nozzle constituting an anode and forming an arc chamber. An elongated rod constitutes a cathode spaced from the constrictor by a gap generally coextensive with the arc chamber. An electrical potential is applied to the anode and cathode to generate an electrical arc in the arc chamber from the cathode to the anode. Propellant is supplied to the arc chamber with generation of the arc so as to produce thermal heating and expansion of the propellant through the nozzle. The thruster employs several features which improve its performance. One feature relates to the use of propellant blends with high specific impulse additives. Another feature relates to injection of the high specific impulse additive into the bulk propellant feed at the region of the cathode tip. Still another feature relates to recirculation of a small fraction of propellant from the constrictor region of the arc chamber and injection thereof into the bulk propellant feed at the region of the cathode tip. A final feature relates to regeneration and reaction of the bulk propellant feed within the structure of the anode body and circulation to the region of the cathode tip.

12 Claims, 3 Drawing Sheets

PERFORMANCE ARCJET THRUSTER

This application is a division of application Serial No. 07/150,591 filed Feb. 1, 1988, now U.S. Pat. No. 9,926,637.

CROSS REFERENCE TO RELATED APPLICATIONS

Reference is hereby made to the following copending U.S. patent applications dealing with related subject matter and assigned to the assignee of the present invention:

1. "Improved Efficiency Arcjet Thruster with Controlled Arc Startup and Steady State Attachment" by S. C. Knowles and W. W. Smith, assigned U.S. Serial No. 06/811,569 and filed July 23, 1986, now U.S. Pat. No. 4,800,716, granted Jan. 31, 1989.
2. "Arcjet Thruster with Improved Arc Attachment for Enhancement of Efficiency" by W. W. Smith and S. C. Knowles, assigned U.S. Ser. No. 103,471 and filed 09/29/87, now U.S. Pat. No. 4,882,465.

BACKGROUND OF THE INVENTION

1 Field of the Invention

The present invention generally relates to small propulsion systems for maneuvering spacecraft and, more particularly, is concerned with an electrothermal arcjet thruster employing any one of several different features for improving performance.

2 Description of the Prior Art

As conventionally known, an electrothermal arcjet thruster converts electrical energy to thermal energy by heat transfer from an arc discharge to a flowing propellant and from thermal energy to directed kinetic energy by expansion of the heated propellant through a nozzle. For an explanation from an historical perspective of arcjet thruster construction and operation and the problems associated with this type of electrothermal propulsion, attention is directed to the following publications: "Arcjet Thruster for Space Propulsion" by L.E. Wallner and J. Czika, Jr., NASA Tech Note D-2868, June 1965; "The Arc Heated Thermal Jet Engine" by F.G. Penzig, AD 671501, Holloman Air Force Base, March 1966; and "Physics of Electric Propulsion" by R.G. Jahn, McGraw-Hill Book Company, 1968. Attention is also directed to U.S. Pat. No. 4,548,033 to G.L. Cann.

Most electrothermal arcjet thrusters have as common features an anode in the form of a nozzle body and a cathode in the form of a cylindrical rod with a conical tip. The nozzle body has an arc chamber defined by a constrictor in a rearward portion of the body and a nozzle in a forward portion thereof. The cathode rod is aligned on the longitudinal axis of the nozzle body with its conical tip extending into the upstream end of the arc chamber in spaced relation to the constrictor so as to define a gap therebetween.

An electric arc is first initiated between the cathode rod and the anode nozzle body at the entrance to the constrictor. The arc is then forced downstream through the constrictor by pressurized vortex-like flow of a propellant gas introduced into the arc chamber about the cathode rod. The arc stabilizes and attaches at the nozzle. The propellant gas is heated in the region of the constrictor and in the region of arc diffusion at the mouth of the nozzle downstream of the exit from the constrictor. The super heated gas is then exhausted out the nozzle to achieve thrust.

Historically, pure propellants, typically ammonia ($NH_3$) or hydrogen ($H_2$), have been used in electrothermal arcjet thrusters. More recently, hydrazine ($N_2H_4$) has been used as the propellant in arcjet thrusters developed by the assignee of the present invention. Propellants such as ammonia and hydrazine are storable in space as a liquid without refrigeration, whereas cryogenic propellants such as hydrogen and helium are not. Specific impulse levels achievable with propellants readily storable in space (e.g. $NH_3$, $N_2H_4$) have been limited to 800-1000 lbf-sec/lbm (pounds of force-second per pounds of mass), substantially lower than typical values of up to 1,500 lbf.sec/lbm achievable with cryogenic propellants (e.g. $H_2He$).

However, the performance advantage of cryogenic propellants due primarily to their very low molecular weights are offset by these same characteristics which make them difficult and expensive to store in space in useful quantities. Nonetheless, it would be desirable to be able to improve thruster performance to a level approaching that achievable using cryogenic propellants without adopting the difficulties normally associated with such propellants.

SUMMARY OF THE INVENTION

The present invention provides an improved performance arcjet thruster designed to satisfy the aforementioned needs. Underlying the present invention is the perception that arcjet thruster performance can be improved and enhanced by a more refined approach to the formulation of the propellant used in the thruster and to the injection and circulation of the propellant stream in the arc chamber of the thruster.

The present invention encompasses several different features, unknown in the prior art, which substantially ameliorate the problems associated with use of cryogenic propellants but have promise for improving the performance of the arcjet thruster for making it an economical and reliable propulsion system for maneuvering spacecraft. Most of the features are advantageously incorporated together in the same arcjet thruster to realize significantly improved efficiency and performance, although in certain instances the advantages to be derived from some of the features can be enjoyed separately from the others in different thrusters.

Basically, each of the features provide enhancement of arcjet thruster performance, efficiency and/or useful lifetime. One feature relates to the addition of small amounts of a second gas component, preferably a cryogenic propellant, to the bulk stream of storable propellant feed to the arcjet to increase specific impulse.

Another feature relates to the injection of small amounts of a second gaseous propellant, again preferably a cryogenic propellant, into the region of the arc chamber surrounding the cathode of the thruster in order to, first, modify the physical properties of the arc column to reduce the amount of energy lost to frozen flow losses, and, second, control the thermal and chemical environment of the cathode surface to minimize thermal stress and chemical erosion and thereby increase cathode life.

Still another feature relates to the recirculation of a small fraction of propellant, using the substantial pressure differential between the source in the constrictor boundary layer and the injection site near the cathode as a means of preheating propellant feed to the central arc region in order to increase thruster efficiency and specific impulse.

A final feature relates to the generation of a propellant gas mixture for enhancing arcjet performance by controlled decomposition of a feed gas in a reactor/regenerator which utilizes waste heat available from the thruster anode body.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
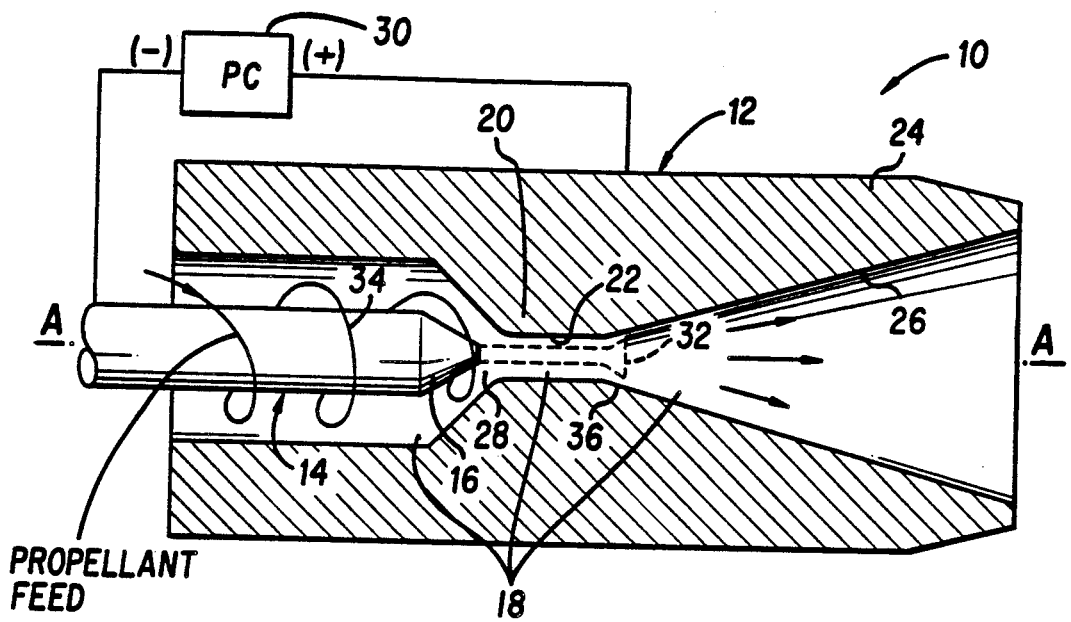
FIG. 1 is a schematical axial sectional view of the cathode rod and anode nozzle body of a standard prior art arcjet thruster.

In the following description, like reference numerals designate like or corresponding parts throughout the several views of the drawings. In different embodiments of the thrusters containing the features of the present invention, parts corresponding to those of the standard or prior art thruster will have the same reference numerals but different letters associated therewith.

Standard Arcjet Thruster of the Prior Art

Referring now to the drawings, and particularly to FIG. 1, there is shown in schematical fragmentary form a standard constricted arc geometry electrothermal arcjet thruster of the prior art, generally indicated by the numeral 10. As conventionally known, the arcjet thruster 10 basically includes an anode 12 in the form of a cylindrical body composed of electrically-conductive metal and a cathode 14 in the form of an elongated cylindrical rod composed of electrically-conductive metal with a conical tip 16. The anode body 12 has an arc chamber 18 defined by a constrictor 20 in the form of a cylindrical surface 22 in a rearward portion of the body and a nozzle 24 in the form of a conical surface 26 in a forward portion thereof. The cathode rod 14 is aligned on the longitudinal axis A of the anode body 12 with its tip 16 extending into the upstream end of the arc chamber 18 in spaced relation to the constrictor 20 so as to define a gap 28 therebetween.

A power controller 30 is electrically connected between the anode body 12 and the cathode rod 14 and is operable in a known manner for establishing an electrical potential therebetween, being positive at the anode body 12 and negative at the cathode rod 14, to initiate generation of an arc 32 across the gap 28. The power controller 30 is represented in block form since its components are well known in the art, and to reproduce them in detail would only serve to increase the complexity of the explanation of the arcjet thruster 10 without adding to its clarity.

The arc 32 is first initiated between the tip 16 of the cathode rod 14 and the anode body 12 at the entrance to the constrictor 20. The arc 32 is then forced downstream along the surface 22 of the constrictor 20 by pressurized vortex-like flow of a propellant gas, as represented by the arrow 34, through and past the gap 28, through the constrictor 20 and out the nozzle 24 of the thruster 10. The arc 32 stabilizes at the surface 26 of the nozzle 24 of the anode body 12.

In the above-described standard constricted arc geometry arcjet thruster 10, the electric arc 32 is "constricted" by the parallel electrode geometry of the constrictor cylindrical surface 22 and by the radial gas dynamic forces of the induced vortex generated by tangential injection of the propellant. The propellant gas is heated in the region of the constrictor 20 and in the region of arc diffusion at the mouth 36 of the nozzle 24 downstream of the exit from the constrictor. This superheated gas is then exhausted out the nozzle 24 to achieve thrust. The electrical circuit of the arcjet thruster 10 is completed between the cathode rod 14 and anode body 12 with arc attachment occurring in the region of the nozzle mouth 36. The location of arc attachment in the anode body 12 is determined by the mass flow rate, which "pushes" the arc diffusion region down the nozzle 24, and by the availability of an electrically conductive region, i.e. the anode body, for arc attachment.

Shortcomings of Standard Arcjet Thruster

Suboptimal performance of the standard arcjet thruster 10 can be attributed, at least in part, to two shortcomings. A first shortcoming is that, as mentioned briefly earlier, the propellants most commonly considered for use in arcjets in space propulsion, such as ammonia and hydrazine, while relatively easily storable in space, are limited in the specific impulse levels they can achieve. Thus, as would be expected, their use results in suboptimal performance of the thruster. Other potential propellants, such as the cryogenic gases hydrogen and helium, while capable of achieving much higher specific impulse levels, raise storability issues which make them unlikely candidates for missions requiring large propellant masses.

A second shortcoming is that in life tests beyond eight hours the standard arcjet thruster 10 exhibits substantial erosion of the cathode 14 due to extended operation at very high cathode temperature levels and exposure during this time to highly reactive species formed from trace impuritias in the grades of ammonia and hydrazine typically used as propellants. More specifically with respect to the second shortcoming, in the standard arcjet thruster 10 the propellant gas is introduced into the portion of the arc chamber 18 surrounding the cathode 14 in such manner as to impart a substantial circumferential velocity vector in addition to the velocity component directed downstream along the axis A of the anode body 12 and the constrictor 20 therein. The result is a vortex flow concentric with the axis A and in a general direction parallel to the cylindrical surface 22 of the constrictor 20 towards the expansion nozzle 24. A characteristic of such vortex flow regime is a lower pressure, central core surrounded by a higher pressure, outer flow region near the constrictor wall or surface 22. The resulting radial pressure gradient serves to stabilize the arc 32 which is struck axially between the cathode 14 and anode body 12, and confine it to the central, lower pressure core, as shown in FIG. 1. Such gas dynamic confinement facilitates operation of the arc 32 at temperatures far in excess of the melting point of the material of the anode body 12, which is generally a refractory such as tungsten. Very large radial temperature gradients exist in the constrictor 20 and nozzle 24, with temperatures near the center of the plasma arc 32 in excess of 10,000 degrees K, and bulk average temperatures of from 3500 to 5000 degrees K. Arc operation and thus thruster performance are governed by a complex balance of heat generation, heat transfer, chemical/ionic reaction, and radiation processes which are strongly affected by the properties of the propellant gas.

The features of the present invention which will now be described relate directly to different propellant mixtures or formulations for use in the arcjet thruster and to modifications in injection and circulation of the propellant stream in the arc chamber so as to reduce the shortcomings of the standard arcjet thruster 10 described above and thereby improve performance thereof.

Propellant Blends With High Specific Impulse Additives

The first feature of the present invention is directed to achievement of enhanced arcjet thruster performance through provision of a different propellant mixture wherein the conventional bulk propellant contains a higher specific impulse additive. Small amounts of a second, low molecular weight gas component, such as the cryogenic gas hydrogen mixed with a bulk storable propellant gas, such as ammonia, has proven to result in arcjet thruster performance which is enhanced to a greater extent than would be predicted by mass weighted averaging of the pure component performance parameters.

Figure 2:
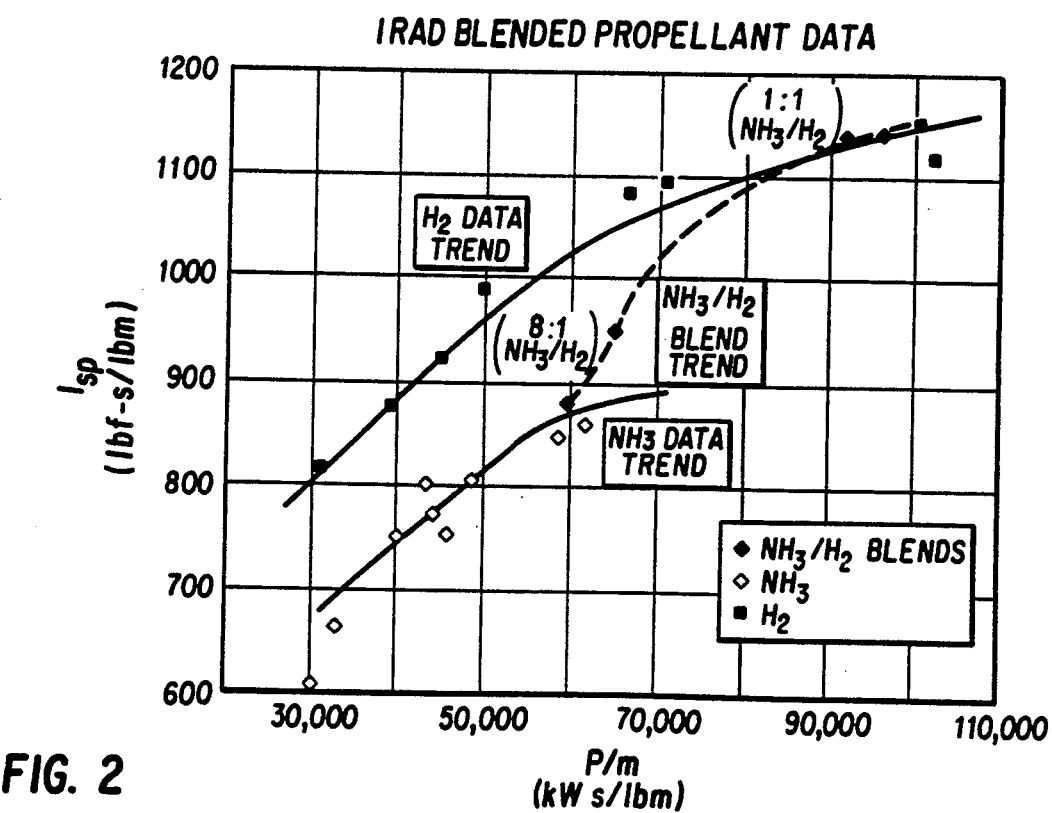
FIG. 2 is a graph illustrating the relationship of specific impulse as a function of the ratio of thruster input power to total mass flow rate for different propellant mixtures in accordance with a first feature of the present invention.

This improvement in thruster performance is illustrated by the graph of FIG. 2, which presents data obtained through tests with a 30 kW class arcjet thruster. The data are plotted as specific impulse (Isp) as a function of the ratio of thruster input power (P) to total mass flow rate (m) for different propellant mixtures or blends. Experimental data for pure hydrogen ($H_2$) pure ammonia ($NH_3$) feed gases are shown, as well as ($NH_3:H_2$) blends. Thus a bulk mixture of 20% hydrogen and 40% ammonia by weight, can produce specific impulse values in an thruster are near the average of the pure component specific impulses.

Such dramatic due in general to the way in which the lower molecular weight additive, such as hydrogen, affects the physics of arc operation, and specifically to a reduction in frozen flow losses. Frozen flow losses which include ionization, disassociation, and deposition of energy into excited molecular states, occur when the propellant gas is heated to very high temperatures by close contact with an electric arc and then exhausted out a nozzle. Insufficient time in high pressure regions is allowed to recombine the ions or disassociated molecules or to relax the excited states. Energy locked into these processes is, therefore, lost and unavailable for thrust.

The small amounts of additives or "seed" components may be added to the bulk propellant stream in any of several ways. One way is the bulk mixing of separately stored components to a homogeneous mixture prior to introduction to the arc chamber at the cathode. Another way is the storage and subsequent use of the gases as a homogeneous mixture. Still another way is the injection of the separately stored additive into the region surrounding the cathode, and thus preferentially into the central arc region of the flow, where the modification of arc operation can be even more dramatic than with bulk mixing of the components upstream from the thruster. (Means for such injection relate to the second and third features of the present invention described next.) Yet another way is generation of the desired additive by controlled partial chemical decomposition of the bulk propellant feed stream in a reactor/regenerator which utilizes waste heat from the thruster anode body. (Means for such additive generation relates to the fifth feature of the present invention described later below.)

Propellant Injection in Cathode Tip Region

Figure 3:
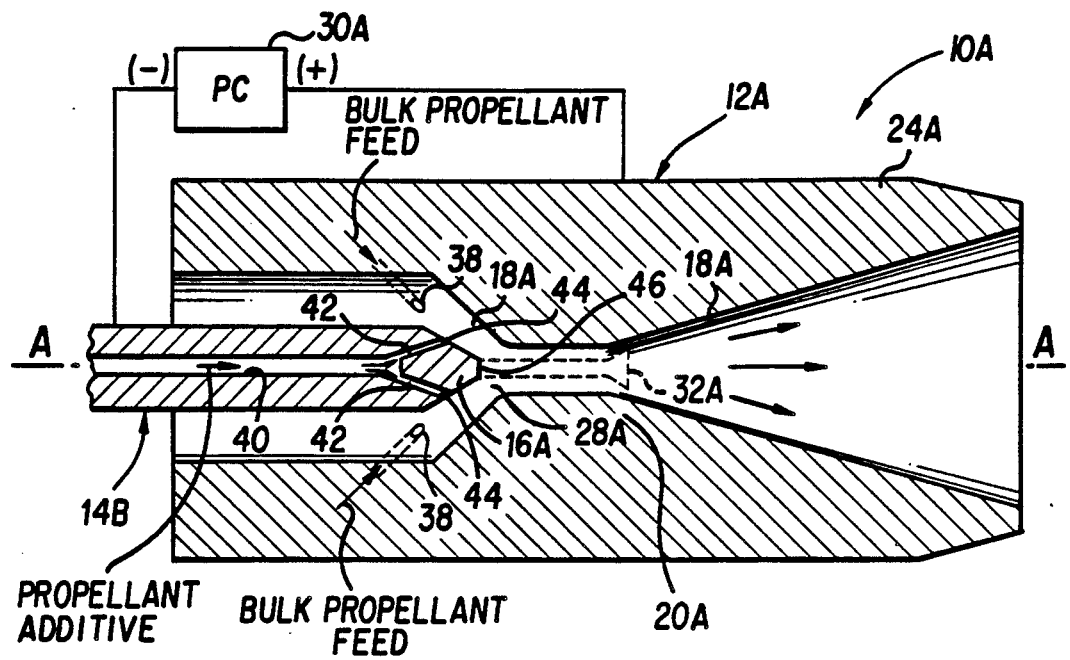
FIG. 3 is a schematical axial sectional view of a first embodiment of an improved performance arcjet thruster having a first type of propellant injection in accordance with a second feature of the present invention.
Figure 4:
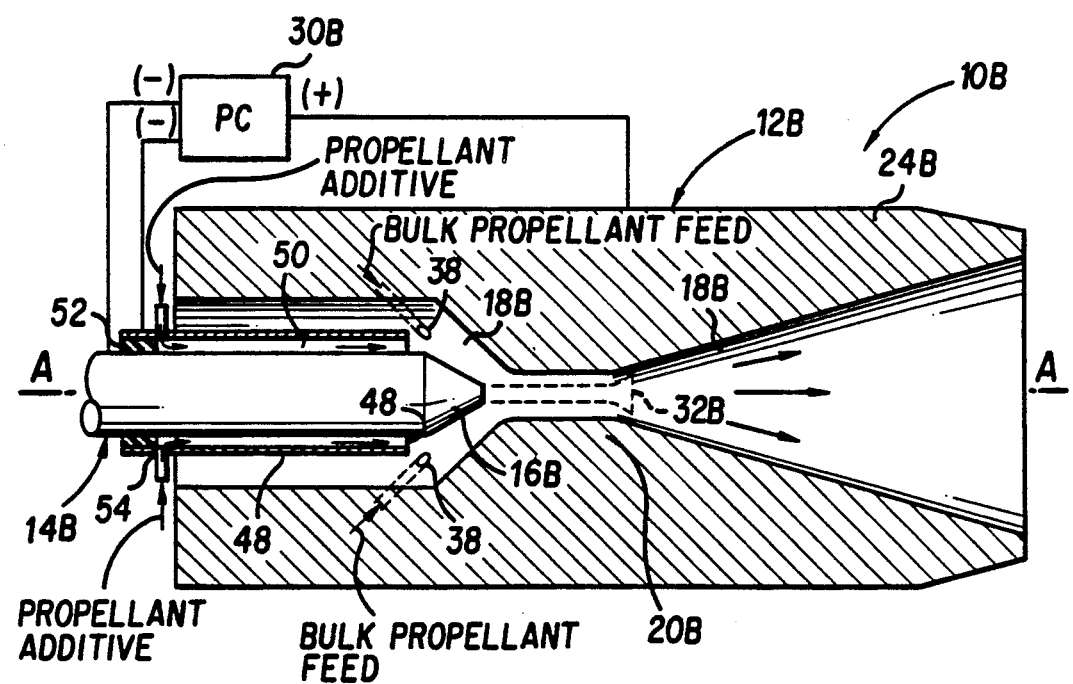
FIG. 4 is a schematical axial sectional view of a second embodiment of an improved performance arcjet thruster having a second type of propellant injection in accordance with a third feature of the present invention.

The second and third features of the present invention relate to two different means for injecting the separately stored bulk propellant and additive into the region surrounding the cathode. FIGS. 3 and 4 show first and second embodiments of an improved performance arcjet thruster, generally designated 10A and 10B, employing these respective features. The basic designs and components of the thrusters 10A, 10B are generally similar to that of the standard thruster 10 of FIG. 1, thus, only the differences between them will be described in detail hereinafter.

In both first and second embodiments, the thrusters 10A, 10B include ports 38 defined through their anode bodies 12A, 12B for injection of bulk propellant streams into the respective arc chambers 18A, 18B upstream of the cathode tips 16A, 16B. The angular relationships of the ports 38 relative to the axes A of the anode bodies 12A, 12B are such that the injected bulk propellant streams create vortex flows in and along the axes of the respective chambers 18A, 18B and constrictors 20A, 20B. The ports 38 are connected via lines (not shown) to a suitable source (not shown) of bulk propellant gas such as has been provided in arcjet thrusters heretofore.

Further, the first thruster embodiment of FIG. 3 illustrates means for injecting a propellant additive from through the cathode rod 14A into the region of the arc chamber 18A at the cathode tip 16A and into the central region of the arc 32A. The injection means is in the form of a central, larger diameter, cylindrical passageway 40 having a plurality of smaller diameter end channels 42 being defined longitudinally through the cathode rod 14A of the thruster 10A. The end channels 42 extend in outward flared fashion from the downstream end of the passageway 40. The channels 42 have outlets 44 located nea the downstream edge 46 of the cathode tip 16A, but far enough upstream therefrom and from the initial arc attachment zone with the anode 12A across the gap 28A therebetween to avoid deformation of the portions of the cathode surrounding and defining the channels 42 due to the high temperatures at the cathode tip 16A. Also, the cathode rod edges forming the outlets 44 of the channels 42 must be smoothly rounded to an appropriate radius to prevent arc attachment at the outlets 44.

The second thruster embodiment of FIG. 4 illustrates an alternative means for injecting a propellant additive from along the exterior of the cathode rod 14B into the region of the arc chamber 18B at the cathode tip 16B and into the central region of the arc 32B. The injection means is in the form of a hollow cylindrical sleeve or sheath 48 disposed concentrically about and extending along the cathode rod 16B and which defines therebetween an annular flow conduit 50. The sheath 48 is closed at its upstream end by an insulative ring 52 which mounts the sheath in insulative and spaced relation to the cathode rod 16B. The sheath 48 has a series of circumferentially spaced apertures 54 formed therethrough near and down. stream of the rind 52 by which the annular flow conduit 50 receives the propellant additive gas from a suitable source (not shown). The downstream end of the sheath 48 is open. It must be appropriately rounded to prevent arc attachment and be far enough upstream from the cathode tip 16B to prevent damage from he severe thermal environment of the arc attachment zone.

The sheath 48 may be connected to the power controller 30B for maintaining it at some electrical potential slightly higher than that of the cathode 14B to further retard arc formation between the sheath 48 and the anode body 12B. However, its electrical potential must not be so high as to facilitate arc formation between the sheath 48 and cathode rod 14B.

In both embodiments of FIGS. 3 and 4, the secondary stream of the additive gas in injected into the arc chambers 18A, 18B so that it is drawn into the axial arc region of the respective constrictors 20A, 20B due to the vortex flow pattern created by the bulk propellant injection. The cathode tip designs also facilitate substantial cooling of the cathodes 14A, 14B, thereby extending cathode life. In addition, both cathode tip designs may be used to condition the chemical environment of the hot cathodes to prevent or substantially reduce chemical reaction between the respective cathodes 14A, 14B and the propellant gases or attendant gaseous impurities, thereby extending cathode life. Finally, both cathode tip designs may be used to facilitate boundary layer recirculation, as described below.

Boundary Layer Recirculation

Figure 5:
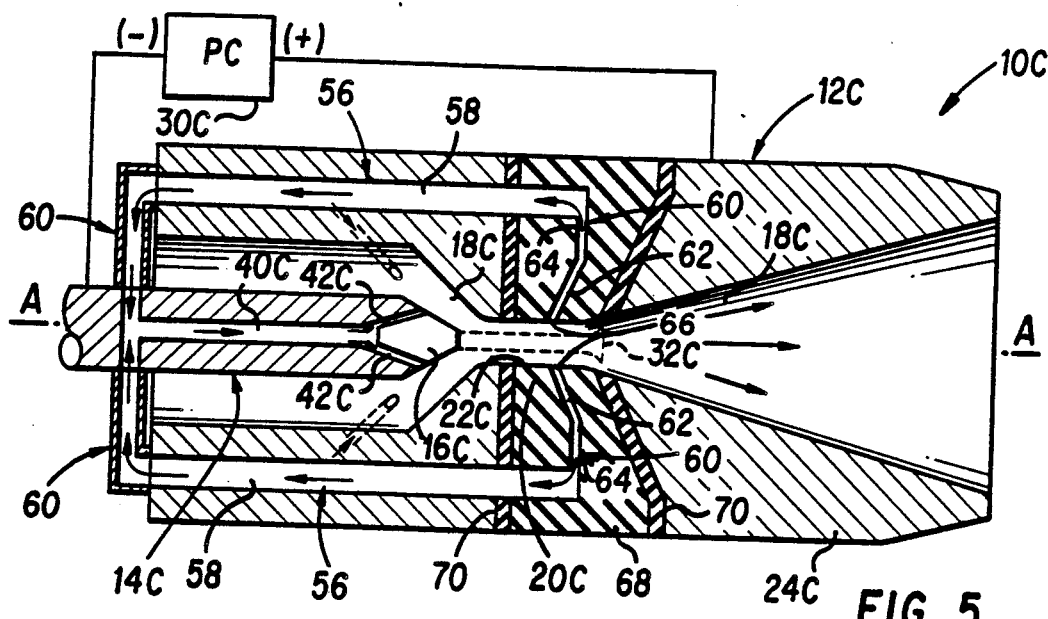
FIG. 5 is a schematical axial sectional view of a third embodiment of an improved performance arcjet thruster having a first type of propellant injection and circulation in accordance with a fourth feature of the present invention.

The fourth feature of the present invention relates to means for recirculating a portion of the collar outer vortex flow of propellant gas from the constrictor via either one of the cathode tip designs of FIGS. 3 and 4 to the central arc region. FIG. 5 shows a third embodiment of an improved performance arcjet thruster, generally designated 10C, employing this feature. The basic design and components of the thruster 10C are generally similar to that of the first thruster embodiment 10A of FIG. 3; thus, only the differences between them will be described in detail hereinafter.

More particularly, the recirculating means is in the form of at least a pair of return passages 56 having generally U-shaped configurations. The base portion 58 of each passage 56 is defined in the anode body 12C so as to extend parallel to its axis A. Leg portions 60 are defined in the anode body 12C at respective upstream and downstream ends of each passage 56 (which are located in correspondence to the constrictor 20C and the upstream end of the cathode rod 14C, respectively) so as to extend generally radially with respect to the axis A. The upstream one of the leg portions 60 has inner and outer sections 62, 64 with the inner section being inclined relative to the axis A toward the nozzle 24C of the anode body 12C. Propellant recirculation through the return passages 56 is driven by the steep radial pressure gradient in the constrictor 20C due to the vortex flow therethrough. The wall to center pressure ratio at a given axial position in the constrictor can be as high as 2:1.

Therefore, in this boundary layer recirculation design of the third thruster embodiment 10C, a small amount of propellant gas from the cooler outer flow is removed via the openings 66 to the inner sections 62 of the return passage upstream leg portions 60 which are defined in the constrictor cylindrical wall or surface 22C. The removed gas flow is routed via the return passages 56 within the anode body 12C to the cathode rod 14C for injection into the central arc region. FIG. 5 illustrates the return passages 56 of the boundary layer recirculation design in conjunction with a cathode injection design as illustrated in FIG. 3 wherein a central passageway 40C with end channels 42C is utilized as in the first thruster embodiment 10A of FIG. 3; however, it should be understand that the return passages 56 of the recirculation design of FIG. 5 could just as readily be used in conjunction with the sheath 48 of the cathode injection design in FIG. 4.

To retard arc attachment at the openings 66 to the return passage upstream leg portions 60, an annular portion 68 of the anode body 12C of the thruster 10C containing the openings 66 may be electrically isolated by annular-shaped dielectric spacers 70 from the anode and cathode electrical potentials and connected to the power controller 30C independently thereof to maintain the portion at some potential intermediate to them. A high temperature dielectric is appropriate for use as the insulative spacers 70. As an alternative, the anode body portion 68 can be fabricated from a high temperature dielectric material, as also shown in FIG. 5, thus eliminating the need for the dielectric spacers 68. The material of the spacers 70 and annular anode body portion 68 can be boron nitride, alumina, quartz or any suitable high temperature insulation.

During passage through the constrictor 20C, the outer vortex flow serves primarily to stabilize and confine the arc 32C, thus protecting the constrictor surface 22C. The gas in the vortex flow also undergoes substantial heating by contact with the arc 32C and by contact with the constrictor surface 22C as it passes through the constrictor 20C. In the boundary layers recirculation design, then, the feed to the central arc region is effectively preheated while on its first pass through the con. strictor 20C to stabilize the arc 32C. The use of preheated feed to the central arc region allows higher temperature to be achieved in the arc, and thus facilitates a higher specific impulse thruster.

The fraction of the total flow recirculated in this manner will be as high as 20% on a mass basis, depending on the particular thruster design and power level. Such levels of recirculation are capable of fully supplying the arc portion of the flow with preheated propellant. Recirculation flows may be combined with an additive gas or gases as described previously in connection with the first feature of the present invention.

Propellant Decomposition Reactor/Regenerator

Figure 6:
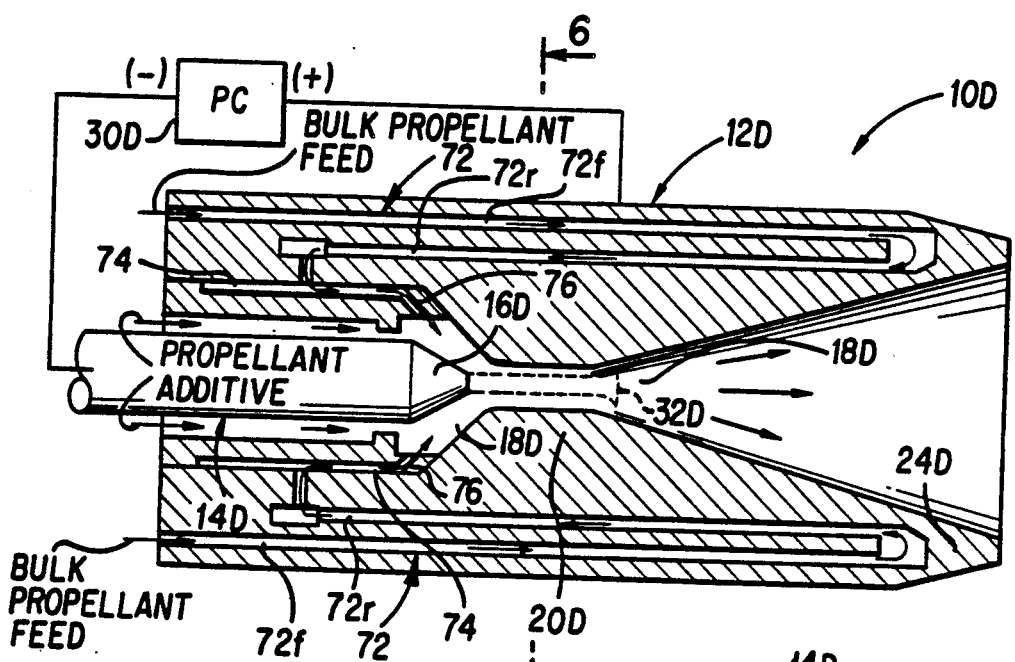
FIG. 6 is a schematical axial sectional view of a fourth embodiment of an improved performance arcjet thruster having a second type of propellant injection and circulation in accordance with a fifth feature of the present invention.
Figure 7:
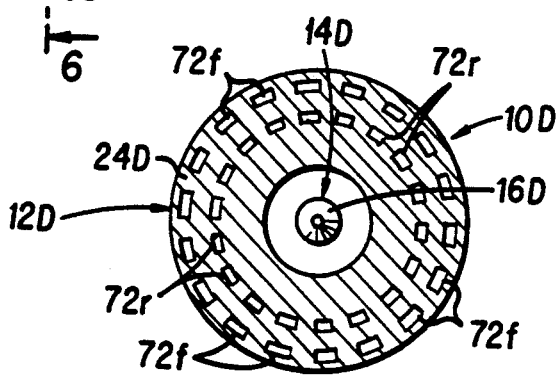
FIG. 7 is a cross-sectional view of the fourth embodiment of the thruster taken along line 6—6 of FIG. 6.

The fifth feature of the present invention relates to means for reacting and regenerating part of the propellant prior to circulating the same to the arc chamber at the location of the cathode. A fourth embodiment of an improved performance arcjet thruster, generally designated 10D, is shown in FIGS. 6 and 7 employing this feature.

The reacting and regenerating means takes the form of multiple regeneration passages 72 defined within the anode body 12D so as to run generally parallel to its axis A. The regeneration passages 72 are circumferentially spaced from one another, as shown in FIG. 7, with regeneration feed passages 72f located radially further from the axis A than the regeneration return passages 72r. The feed passages 72f are connected at their downstream ends to the upstream ends of the return passages 72r. Such connections are located in the anode body 12D near the forward end of the nozzle 24D. As mentioned, part of all of the propellant feed to the thruster 10D is routed through these passages 72 prior to injection into the arc chamber 18D.

From the inner return passages 72r, the propellant feed is routed through flow passages 74 defined in the anode body 12D extending parallel to the cathode rod 14D and connected at their upstream ends to the return passages. The propellant feed passes via the flow passages 74 through the injection ports 76 at the downstream ends thereof and located adjacent the cathode tip 16D. In passing through the passages 72, the propellant feed gas is heated to temperatures up to 1600 degrees K.

The regeneration passages 72 can be used in conjunction with either one of the cathode injection designs of FIGS. 3 and 4 in order to inject the partially dissociated propellant feed within the central arc region where its effect is greatest. Such an application does not necessarily require that the entire propellant feed stream be passed through the regeneration passages 72; an option is to pass therethrough only that portion of the total flow to be routed for cathode injection.

The benefits of passing the propellant feed through the regeneration passages 72 prior to injection into the arc chamber 18D are threefold. First, controlled decomposition of the propellant feed gas to form lower molecular weight constituents is facilitated. While residence times in the regeneration passages 72 are typically too short for equilibrium dissociation to occur, partial dissociation can be made to occur such that sufficient quantities of lower molecular weight constituents are generated to cause dramatic thruster performance improvement, as described supra under the section entitled "Propellant Blends With High Specific Impulse Additives".

The specific case of pure ammonia feed gas serves to illustrate the effect. Although equilibrium dissociation of $NH_3$ at 1600 degrees K and 1·2 atmospheres of pressure (a typical feed pressure for arcjet thrusters) is complete, such complete dissociation is unlikely due to regeneration passage residence time limits. However, partial endothermic dissociation of ammonia in an arcjet thruster regenerator can produce quantities of diatomic and monatomic hydrogen ($H_2$ and H) sufficient to dramatically increase thruster performanca over that with a pure NH feed. Such dissociation can be homogeneous gas phase reaction, or it can be promoted by a catalytic agent applied on the regeneration passage walls or to substrate particles packed into the passages. It is well known that $NH_3$ decomposition is catalyzed by rhenium, a refractory metal suitable for anode body fabrication. The degree of propellant dissociation may be controlled as desired by judicious design of arcjet operating conditions (mass flow rate, power, current), the anode and regeneration passage configurations, (and thus the residence time therein) and use of catalyst and substrate.

Second, preheating of the propellant feed gas facilitates higher bulk average temperatures at the constrictor exit, and thus higher specific impulse levels. Third, cooling of the anode body reduces thermal stress on thruster materials, thus extending thruster life. Cooling of the anode body also reduced thermal radiation from the anode outer surface, thus simplifying thermal management associated with thruster/spacecraft integration.

For mass flow rates and heat transfer coefficients typical of arcjet thrusters, the propellant gas flowing through the regeneration passages 72 can remove only a portion of the waste heat being deposited into the anode body 12D by the arc 32D in the arc attachment region of the nozzle 24d. Care must therefore be taken in designing the passage configu. ration to ensure that the radial conductive path between the passages is wide enough to allow sufficient heat conduction to the anode outer surface, from which the anode body is cooled radiatively. Inadequate conduction paths through the passages 72 can cause temperatures at the surfaces 22D and 26D respectively of the constrictor 20D and nozzle 24D to approach or exceed even the melting point of tungsten.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In an arcjet thruster, the combination comprising:
   (a) a body forming an annular-shaped constrictor and an annular-shaped nozzle being tandemly-arranged and having respective surfaces which together define an arc chamber, at least said nozzle being electrically conductive to constitute an anode;
   (b) an elongated member having a tip disposed adjacent to and spaced upstream from said constrictor, said member being electrically conductive to constitute a cathode spaced from said anode by a gap generally coextensive with said arc chamber;
   (c) means for applying an electrical potential to said anode and cathode so as to generate an electrical arc in said arc chamber from said cathode to said anode which produces thermal heating of propellant gases flowing through said chamber and expansion thereof through said nozzle; and
   (d) means for separately injecting a separately supplied bulk propellant having a first specific impulse and a propellent additive having a second specific impulse greater than said first specific impulse into said arc chamber in the region of said tip of said cathode, said injecting means including means for injecting the propellant additive from along the exterior of said cathode into said arc chamber at the region of said cathode tip and into a central region of the arc formed between said cathode and anode.

2. The arcjet thruster as recited in claim 1, wherein said propellant additive injection means includes a hollow sheath disposed concentrically about, spaced outwardly from, and extending along said cathode so as to define therebetween an annular flow conduit.

3. The arcjet thruster as recited in claim 12, wherein said propellant additive injecting means further includes an insulative ring which mounts said sheath in closed, insulated and spaced relation to said cathode at an upstream end of said sheath.

4. The arcjet thruster as recited in claim 3, wherein said sheath has a series of circumferentially spaced apertures formed therethrough adjacent to and downstream of said ring by which said annular flow conduit receives the propellant additive.

5. The arcjet thruster as recited in claim 2, wherein said sheath is open at a downstream and thereof located adjacent to and upstream of said cathode tip.

6. The arcjet thruster as recited in claim 2, wherein said sheath is electrically connected to said electrical potential applying means for maintaining said sheath at a predetermined electrical potential slightly higher than that of said cathode to retard arc formation between said sheath and said body but not promote arc formation between said sheath and said cathode.

7. In an arcjet thruster, the combination comprising:
(a) means forming an annular-shaped constrictor and an annular-shaped nozzle being tandemly-arranged and having respective surfaces which together define an arc chamber, at least said nozzle being electrically conductive to constitute an anode;
(b) an elongated member having a tip disposed adjacent to and spaced upstream from said constrictor, said member being electrically conductive to constitute a cathode spaced from said anode by a gap generally coextensive with said arc chamber;
(c) means for applying an electrical potential to said anode and cathode so as to generate an electrical arc in said arc chamber from said cathode to said anode which produces thermal heating of propellant gases flowing through said chamber and expansion thereof through said nozzle;
(d) means for supplying a bulk propellant having a first specific impulse to said arc chamber, said supplying means including means for reacting and regenerating at least a portion of the bulk propellant prior to supplying the same to said arc chamber at the region of said cathode; and
(e) means for injecting a propellant additive having a second specific impulse greater than said first specific impulse into said arc chamber at the region of said cathode tip.

8. The arcjet thruster as recited in claim 7, wherein said reacting and regenerating means includes multiple regeneration passages defined within said anode body so as to run generally parallel to a longitudinal axis thereof and coextensive with said constrictor and nozzle of said body.

9. The arcjet thruster as recited in claim 7, wherein said regeneration passages are composed of a first plurality of circumferentially spaced feed passages and a second plurality of circumferentially spaced return passages located radially closer to the axis of said body than said feed passages, said feed passages being connected at their downstream ends to upstream ends of said return passages.

10. The arcjet thruster as recited in claim 7, wherein said reacting and regenerating means further includes multiple flow passages defined within said anode body so as to run generally parallel to its longitudinal axis thereof and located radially closer to the axis than said return passages, said flow passages being connected at their upstream ends to downstream ends of said return passages, said flow passages having injection ports at downstream ends thereof located adjacent to and upstream of said cathode tip.

11. The arcjet thruster as recited in claim 7, wherein said injecting means includes means for injecting the propellant additive from along the exterior of said cathode into said arc chamber at the region of said cathode tip and into a central region of the arc formed between said cathode and anode.

12. The arcjet thruster as recited in claim 11, wherein said propellant additive injecting means includes a hollow sheath disposed concentrically about, spaced outwardly from, and extending along said cathode so as to define therebetween an annular flow conduit.

* * * * *